United States Patent

[11] 3,553,438

| [72] | Inventors | Melvin H. Blitz<br>Framingham;<br>George G. Pick, Lexington, Mass. |
|---|---|---|
| [21] | Appl. No. | 846,644 |
| [22] | Filed | July 18, 1969 |
| [45] | Patented | Jan. 5, 1971 |
| [73] | Assignee | Sylvania Electric Products, Inc.<br>a corporation of Delaware |

[54] MARK SENSING SYSTEM
8 Claims, 8 Drawing Figs.

[52] U.S. Cl........................................... 235/61.11,
178/6, 178/7.6, 315/8.5, 356/24
[51] Int. Cl.......................................... G06k 7/10,
H04n 3/00, H04n 7/00
[50] Field of Search............................ 235/61.11,
61.115, 115CR, 115CRT; 315/8.5, 21, 23, 25,
84.5; 340/146.3; 178/6, 8, 7.2; 356/23, 24

[56] References Cited
UNITED STATES PATENTS
| 2,307,728 | 1/1943 | Mertz............................ | 235/61.11(5) |
| 2,612,994 | 10/1952 | Woodland et al............ | 235/61.11(5) |
| 3,050,711 | 8/1962 | Harmon....................... | 340/146.3 |
| 3,414,731 | 12/1968 | Sperry.......................... | 250/219(ID) |
| 3,431,402 | 3/1969 | Childs.......................... | 235/61.11(5) |

*Primary Examiner*—Maynard R. Wilbur
*Assistant Examiner*—Thomas J. Sloyan
*Attorney*—Stanley M. Schurgin ABSTRACT: Mark sensing systems for reading a light-reflecting label which includes a plurality of radial data code elements circularly arranged in a predetermined coded format around a bull's eye acquisition target formed from a plurality of concentric ring code elements. In accordance with one embodiment of the invention, an image of the label is derived by a rotating mirror wheel and directed onto an image dissector, and the image is linearly scanned in the image dissector to determine the presence of the label by sensing the image of the acquisition target, and then circularly scanned to derive the data content of the label by sensing the images of the radial data code elements. In other embodiments of the invention, the image of the label is scanned simultaneously in a linear scan pattern and a circular scan pattern or, alternatively, in a cycloidal scan pattern. An all-electronic version of the invention, requiring no rotating mirror wheel, is also disclosed.

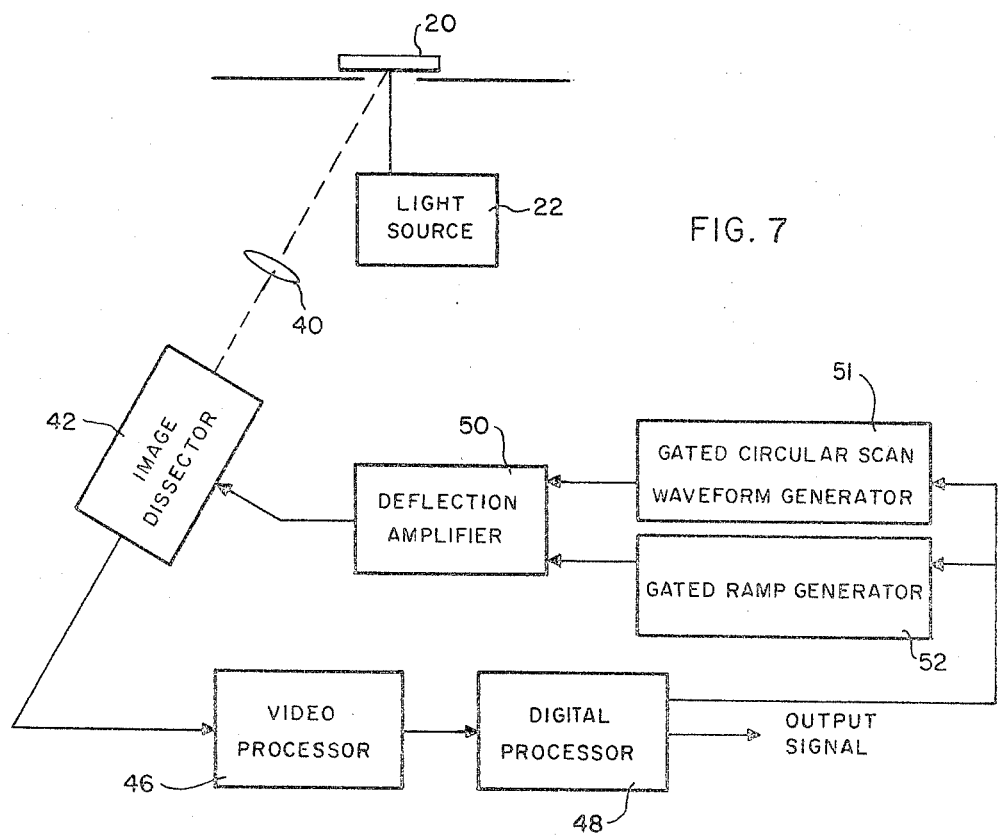
FIG. 7
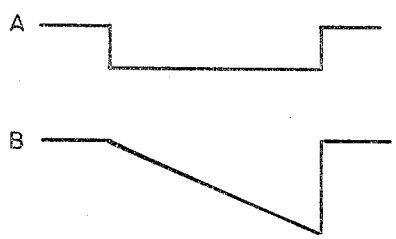
FIG. 4
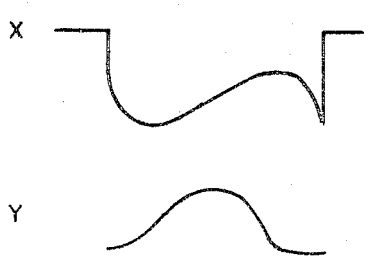

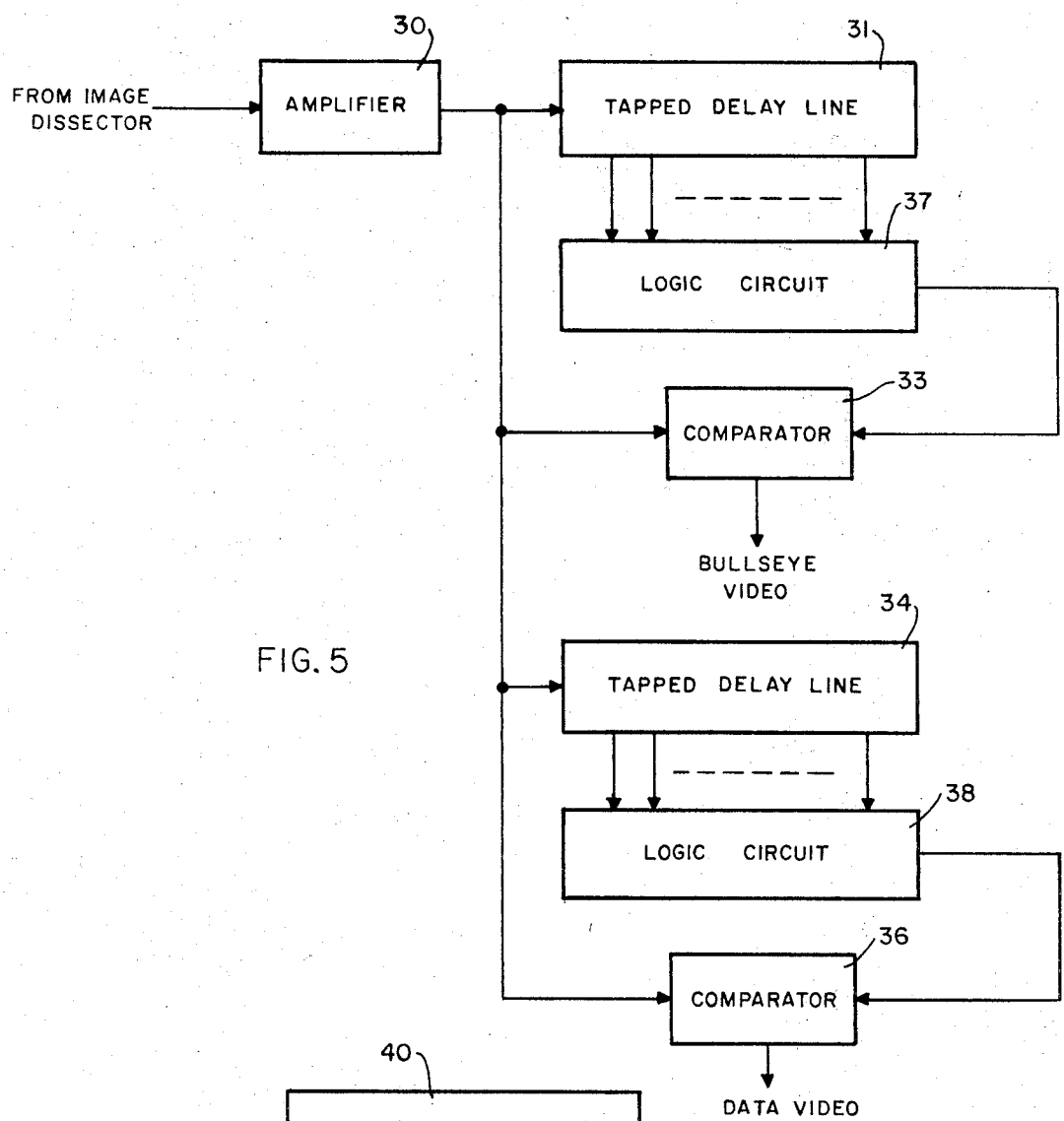
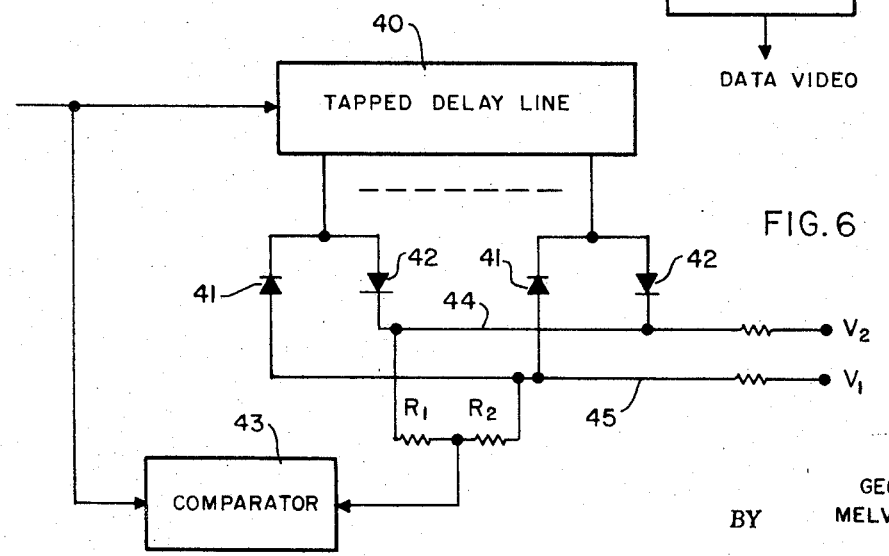

MARK SENSING SYSTEM

This is a continuation of application Ser. No. 592,103 filed Nov. 4, 1966 and now abandoned.

This invention relates to mark sensing systems and particularly to systems for reading circularly disposed coded data.

Various mark sensing systems are presently employed for automatically reading checks, sorting mail and identifying moving railway cars and have reached the point of commercial practicality. A commercially attractive system for merchandise checkout, inventory control, and the like has not, however, been demonstrated heretofore, although many such systems have been suggested. These previously suggested systems have not been commercially feasible by reason of awkward label configurations and codes, complex reading means and the attendant disadvantages of unreliability and high cost.

In order to be commercially attractive, an automatic label reading system for use in merchandise checkout and control, for example, automated checkout in a supermarket, must be extremely reliable and of relatively low cost, and should employ a small, easily affixed and inexpensive label containing judiciously coded information.

It has been discovered that data can be encoded in a circular format which can accommodate a variety of codes, together with timing and tracking information, in a relatively small physical area. Such circular format has the added advantage of being insensitive to orientation; that is, it can be machine readable in any orientation.

Briefly, the system employs a label affixed to or otherwise disposed on an item and having judiciously coded circularly disposed data thereon representing the particular item, and an electroptical scanner which circularly scans this label to produce electrical signals indicative of the encoded label data. These electrical signals are then processed by suitable circuitry to provide data signals of a form suitable for subsequent data processing or display. Data is encoded on the label in such a manner that orientation of the label during scanning is unnecessary, and tracking of the label as it is being scanned is also unnecessary by virtue of the manner of operation of the scanner.

In operation, an item to be identified and containing identifying data encoded thereon moves across an area with respect to which is located a scanner which is operative to ascertain the presence of a label and to circularly scan the label to decode the data contained therein. The label can be acquired by the scanner via a separate target on the label, such as a bullseye pattern at the label center, or acquisition can be accomplished via the encoded data itself.

The invention will be more fully understood from the following detailed description taken in conjunction with the accompanying drawings, in which:

FIG. 4 shows waveforms useful in explaining the invention;

FIG. 5 is a block diagram of a video processor employed in the label reading systems of FIG. 2;

FIG. 6 is a schematic diagram of the video processor; and

FIG. 7 is a block diagram of an alternative embodiment of a system according to the invention.

Figure 1B:
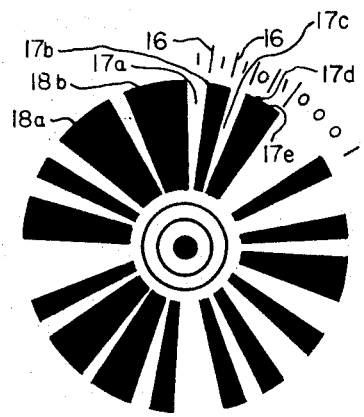
FIGS. 1A and 1B are illustrations of typical label code configurations useful in the present invention.
Figure 1A:
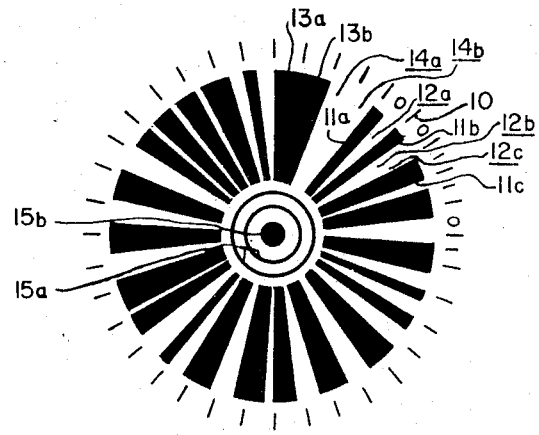

In accordance with the present invention, data is arranged in an annular configuration, two typical configurations being illustrated in FIGS. 1A and 1B. Data is represented by a suitable coded sequence of black marks on a white background, with timing data also included in the code. Data can also be represented by marks which are colored, fluorescent or retroflective. In general, any indicia which is optically differentiable from its background can be employed in the present invention. The scanning system must, of course, detect that a label is present in order to begin its reading operation. The presence of a label can be ascertained by recognition of the data code itself or a separate acquisition code can be employed. The circuitry required for label acquisition can generally be simplified by providing on the label a suitable code used only for acquisition purposes, a particularly effective acquisition code being a bullseye pattern composed of a plurality of concentric black circles 15a and center dot 15b on a white background disposed in the center of the label. These circles, of course, can be other than black as can the data marks, described above.

Referring to FIG. 1A, data is binarily encoded to be read clockwise by a code in which a ONE is represented by a space followed by a larger mark, and a ZERO is represented by a mark followed by a larger space. In FIG. 1A, there are 36 bit positions indicated by index marks 10. Black mark 11a followed by white space 12a indicates a ZERO, as does black mark 11b and space 12b. Space 12c followed by mark 11c represents a ONE. The coding continues in like manner around the annulus. A unique code word is provided to indicate the beginning of a data sequence, and in FIG. 1A, the "start" word consists of two marks 13a and 13b, followed by two spaces 14a and 14b, these marks and spaces being wider than the data segments.

An alternative code configuration is illustrated in FIG. 1B in which a binary ONE is represented by a transition from black to white or white to black, and the lack of a transition indicates a ZERO. Thus, in the illustrated label which is divided circumferentially into 50 bit positions denoted by index marks 16, segment 17a represents a ONE since there is a transition from white to black, and segment 17b also represents a ONE as there is a transition from black to white. Similarly, segment 17c represents a ONE, but segment 17d represents a ZERO as there is no transition between segments 17d and 17e. The coding continues similarly around the label. The "start" code is composed of wide marks 18a and 18b.

Figure 2:
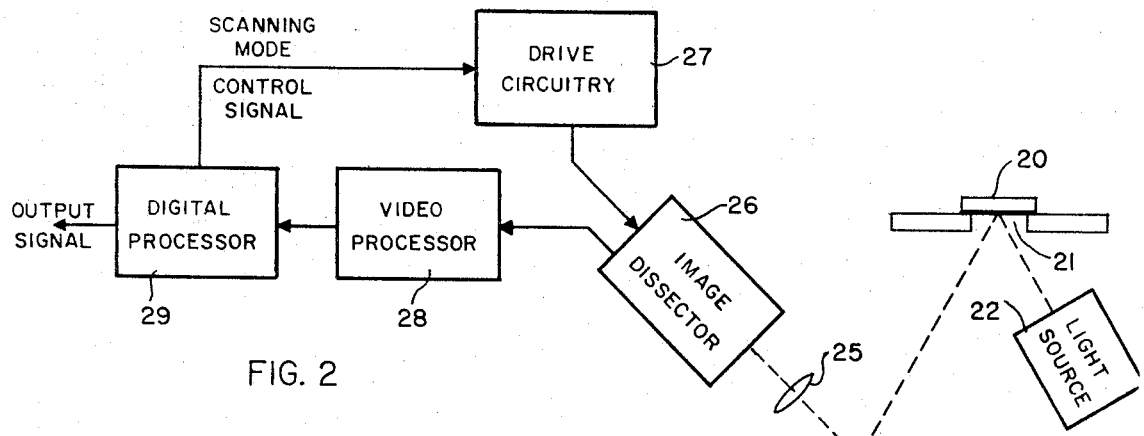
FIG. 2 is a block diagram of a label reading system according to the invention.

Data is read from these labels by ascertaining the presence of a label by detection of the bullseye pattern and then circularly scanning the coded indicia to produce signals representative of the data content of the label. A system for acquiring and reading the label is shown in FIG. 2 in which a label 20 containing data on the lower face thereof is disposed over a rectangular opening 21 illuminated by a continuous light source 22 which may be, for example, one or more tungsten projection lamps. In applications where the label is affixed to items to be identified, such as in the automatic checkout of items in a supermarket, the item containing the label is moved across opening 21 and is read at a particular point in its travel thereacross. To acquire the label, light reflected from the label is scanned along the length of the slot (in and out of the paper) by a rotating mirror wheel 23 driven by a motor 24, and the scanned light is focused by a lens 25 onto the face of an image dissector 26 the scan pattern of which is controlled by suitable drive circuitry 27. In the acquisition mode, the drive circuitry 27 locates the image dissector spot at a fixed radius from the center of the tube face. When light reflected from the label pulse pattern is scanned by the rotating mirror wheel 23, a series of light pulses are produced at the dissector aperture which are presented to image dissector 26 the spot of which is located in a position on the tube face to receive these light reflections. The image dissector converts these light pulses to corresponding electrical pulses which are applied to a video processor 28 which normalizes the pulses and shapes them to a form suitable for subsequent digital processing in digital processor 29. The digital processor 29 contains logic circuitry operative to recognize the pulse pattern representative of the bullseye configuration, thus indicating the presence of a label to be read.

When the bullseye pattern has been identified in the digital processor 29, a scan mode control signal is produced by the digital processor and applied to the drive circuitry 27 which now causes the image dissector 26 to scan in a circular pattern. Light reflected from the coded marks on the label 20 is circularly scanned by the image dissector 26 which produces a series of electrical pulses representative of the circularly coded label data. These signal pulses are normalized by the video processor 28 and then processed by the digital processor 29 the output signal of which is of a form suitable for subsequent display or further data processing.

It is evident that the circular scan of the label 20 must be completed within a specified time, as the label image is being linearly moved by the action of the mirror wheel 23. The time available for reading the data can be increased by employing an image dissector scan pattern which compensates for the linear mirror scan. When the bullseye or other acquisition target is acquired, the image dissector spot is moved in a direction opposite to the linear scan motion to a position centered on the label image, and a relatively slow linear scan begins which compensates for mirror motion. Simultaneously, a circular scan is initiated to scan the label data, which is now fixed with respect to the scanner for a relatively long period of time.

Figure 3:
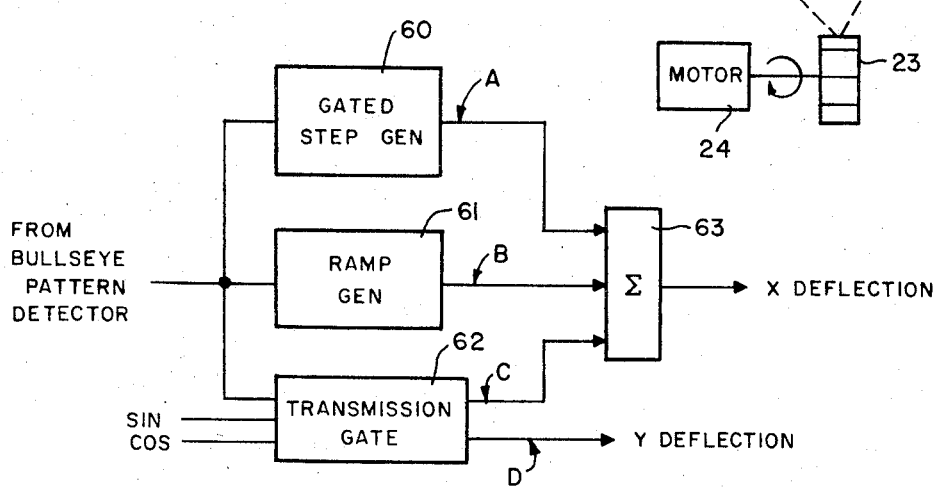
FIG. 3 is a block diagram of drive circuitry employed in the label reading system of FIG. 2.

The scanning operation can be further explained with the aid of FIG. 3, which is a block diagram of the image dissector drive circuitry 27, and the waveforms of FIG. 4. When the target has been acquired, a control signal from the bullseye pattern detector, which is part of digital processor 29, causes a gated step generator 60 to produce the gate pulse shown as waveform A in FIG. 4. At the same time, a ramp generator 61 produces a decreasing ramp, waveform B, and a transmission gate 62 passes a sine and a cosine wave, waveforms C and D, generated by a suitable source. Signals A, B and C are combined in a summing network 63, the output of which is an X deflection signal for the image dissector 26. A Y deflection signal is the cosine wave from the transmission gate 62. These deflection signals are operative to produce a scan pattern in the image dissector which is a cycloid moving opposite to the linear image movement due to mirror rotation. The label image is thereby fixed with respect to the image dissector spot, and scanning is accomplished at a less critical rate.

The system of FIG. 2, with slight modification, is also operative to acquire and scan a label without a separate acquisition target. In this instance, the mirror wheel 23 scans a linear path across a field of view while the image dissector 26 scans a circular pattern, and the resultant scan locus is a cycloid which progresses across the field of view. When a label appears in the viewing field, it is scanned by this cycloidal scan, and at such time as the label is circularly aligned with the scan pattern, and the start code is recognized, the data is read into the logic circuitry and decoded. Recognition of a label is typically indicated by reading the start code twice with a specified time between the two readings and producing and a gating signal which allows entry of the label data into the logic registers.

The video processor 28 is shown in FIG. 5 and includes black-white decision circuitry operative to test the signal levels caused by light reflected from the black and white portions of the coded label in order to distinguish signals from noise. In operation, signal pulses from the circularly scanned image dissector 26 are amplified by an amplifier 30 and applied to a multitapped delay line 31, the output taps of which are connected to a logic circuit 37, the output of which is applied to one input terminal of a comparator 33. The amplified input signal pulses are applied to the other input terminal of the comparator 33. Similarly, the signal pulses are applied to a second multitapped delay line 34 and associated logic circuit 38 and comparator 36, which are identical to the first described components except that the delay line length is different. The delay line length is chosen to be greater than the longest expected pulse to assure the presence of both black and white pulses.

The delay line 31, and its associated circuitry is operative to normalize the pulses from the bullseye acquisition pattern, and the length of the delay line 31 is chosen to be greater than the longest pulse expected from this bullseye. In an embodiment which has been constructed, a delay time of 5 microseconds was used in an 11 tap delay line. The logic circuit 37 is operative to detect the greatest and the least signal level existing at the taps of the delay line and to present the median of these levels to the comparator 33 for comparison with the input signal pulses. The input pulses are, therefore, compared with the median of their recent history and normalized output pulses are produced by the comparator 33 when the signal pulses exceed the threshold set by the delayed reference signal. A normalized pulse representation of the bullseye pattern is thereby produced. In like manner, the tapped delay line 34 and its associated circuitry is operative to produce normalized pulses representative of the coded data pattern. The delay line 34 has a length in this instance greater than the longest data pulse, 15 microseconds in the constructed embodiment.

A more detailed illustration of the thresholding circuitry of FIG. 5 is depicted in FIG. 6. A tapped delay line 40 has its output taps each connected to a pair of oppositely poled diodes 41 and 42. All of the diodes of one polarity are connected together to a fixed source of potential $V_1$ while all the diodes 42 of the opposite polarity are connected together to a second source of potential $V_2$. The two common lines connecting the respectively poled diodes are connected together via a pair of series connected resistors $R_1$ and $R_2$, the junction of these two resistors being connected to one input of a comparator 43, the second input of comparator 43 being the amplified input signals from the image dissector 26. It will be appreciated that each plurality of similarly poled diodes functions as an OR gate and the common line 44 will be at a voltage which represents the lowest potential at the outputs of the tapped delay line 40, while the common line 45 will be at the highest voltage at the taps on the delay line. The signal from the resistive network is, therefore, the median value of the highest and lowest voltage present during the period of time represented by the delay line. This median voltage provides a threshold level for the original signals from the image dissector and the comparator produces a normalized pulse when the signal level exceeds the threshold level. In this manner, the signal level is compared to the levels of the recent signal history to distinguish the true signals from noise signals.

An alternative system for acquiring and reading circularly disposed data is illustrated in FIG. 7. This system differs from that of FIG. 2 in that no rotating mirror is employed; the scanning is accomplished solely by an image dissector 42, which has somewhat higher resolution than the image dissector 26 employed in the electromechanical scanner of FIG. 2. In operation, a label 20 is illuminated by a light source 22 and the label is linearly scanned by the image dissector 42 the scan pattern of which is controlled by drive circuitry including a deflection amplifier 50 and waveform generators 51 and 52. The linear sweep is produced by sawtooth deflection signals controlled by the ramp generator 52. When the bullseye acquisition target is scanned, a series of electrical pulses are produced which are representative of the bullseye pattern, and this pulse sequence is recognized by the logic circuitry of the digital processor 48 as representing the presence of a label. The digital processor 48 now applies a control signal to the waveform generator 51 to temporarily stop the sawtooth in place and to initiate a circular sweep of the image dissector 42 centered at a position determined by the linear sweep during the acquisition mode. The circular scan encounters the annularly encoded data marks and the dissector tube produces pulses representative of these marks, which are processed in the same manner as described hereinabove.

We claim:

1. A mark sensing system comprising:
   a label containing a plurality of discrete code elements arranged in a predetermined coded pattern, said coded pattern including therein a unique coded acquisition target spaced from the remainder of the coded pattern and differing from the remainder of the coded pattern;
   first scanning means for scanning a predetermined area through which said label is arranged to pass and operative when the label is present in the predetermined area to scan the label and to derive an image thereof;

second scanning means for receiving the image of the label derived by the first scanning means, said second scanning means being operative to scan the image of the label in a first geometrical scan pattern when the image of the label is received and in response to scanning the image of the unique coded acquisition target portion of the label to produce first electrical signals indicative of the presence of the label in the predetermined area, and also operative in response to a control signal to scan the image of the label in a second geometrical scan pattern differing from the first geometrical scan pattern, said second geometrical scan pattern generally conforming to the physical arrangement of the discrete code element comprising the remainder of the coded pattern, and in response to scanning the image of the remainder of the coded pattern of the label to produce second electrical signals representative thereof;

control means operative in response to the first electrical signals to produce the control signal to cause the second scanning means to scan the image of the label in the second geometrical scan pattern and to produce the second electrical signals; and processing means for decoding the second electrical signals.

2. A mark sensing system in accordance with claim 1 wherein:

the first scanning means includes a source of light for illuminating the label and a rotating mirror wheel for scanning the label and for receiving light reflected from the label, the reflected light from the label constituting an image of the label; and the second scanning means includes an image dissector having a tube face for receiving an image of a label from the first scanning means and scan control circuitry for causing the image dissector to scan the image of the label in the first and second geometrical scan patterns.

3. A mark sensing system in accordance with claim 2 wherein:

the acquisition target portion of the coded pattern is a bullseye target, and the remainder of the coded pattern comprises discrete, radial, data-representing code elements arranged in a circular format; and the scan control circuitry includes means operative to cause a spot to be located on the tube face of the image dissector whereby when an image of a label is swept past the spot by the rotating mirror wheel the image is scanned in a linear scan pattern, the image dissector producing the first electrical signals indicative of the presence of the label in the predetermined area in response to the image of the bullseye acquisition target being scanned, the scan control circuitry further including means operative in response to the control signal from the control means to cause the image dissector to scan the image of the label in a circular scan pattern, the image dissector producing the second electrical signals representative of the data encoded in the label in response to scanning the image of the radial data-representing code elements.

4. A mark sensing system in accordance with claim 2 wherein:

the acquisition target portion of the coded pattern is a bullseye target, and the remainder of the coded pattern comprises discrete, radial, data-representing code elements arranged in a circular format; and the scan control circuitry includes means operative to cause a spot to be located on the tube face of the image dissector whereby when an image of a label is swept past the spot by the rotating mirror wheel the image is scanned in a linear scan pattern, the image dissector producing the first electrical signals indicative of the presence of the label in the predetermined area in response to the image of the bullseye acquisition target.

5. A mark sensing system in accordance with claim 4 wherein the scan control circuitry comprises:

a gated step generator;

a ramp generator;

said gated step generator and ramp generator being operative in response to the control signal from the control means to generate a gating signal and a ramp signal, respectively;

a source of a sine signal;

a source of a cosine signal;

means for combining the sine signal, the gating signal, and the ramp signal to provide a first deflection signal for the image dissector;

said cosine signal providing a second deflection signal for the image dissector; and said image dissector being operative in response to the first and second deflection signals to scan the image of the label in the cycloidal scan pattern.

6. A mark sensing system comprising:

a label containing a plurality of discrete code elements arranged in a predetermined coded pattern, said pattern including therein a unique coded acquisition target portion spaced from the remainder of the coded pattern and differing from the remainder of the coded pattern;

scanning means for scanning a predetermined area through which said label is arranged to pass, said scanning means being operative when the label is present in the predetermined area to scan the label in a first geometrical scan pattern and in response to scanning the unique coded acquisition target portion of the label to produce first electrical signals indicative of the presence of the label in the predetermined area, and also operative in response to a control signal to scan the label in a second geometrical scan pattern differing from the first geometrical scan pattern, said second geometrical scan pattern generally conforming to the physical arrangement of the discrete code elements comprising the remainder of the coded pattern, and in response to scanning the remainder of the coded pattern of the label to produce second electrical signals representative thereof; control means operative in response to the first electrical signals to produce the control signal to cause the scanning means to scan the label in the second geometrical scan pattern and to produce the second electrical signals; and processing means for decoding the second electrical signals.

7. A mark sensing system in accordance with claim 6 wherein: the scanning means includes a source of light for illuminating the label, an image dissector having a tube face for receiving light reflected from the label, the reflected light constituting an image of the label, and scan control circuitry operative to cause the image dissector to scan the image of the label in the first and second geometrical scan patterns.

8. A mark sensing system in accordance with claim 7 wherein:

the remainder of the coded pattern comprises discrete, radial, data-representing code elements arranged in a circular format; and the scan control circuitry includes means operative when an image of a label is received by the image dissector to cause the image dissector to scan the image in a linear scan pattern, the image dissector producing the first electrical signals indicative of the presence of the label in the predetermined area in response to scanning the image of the bullseye acquisition target, the scan control circuitry further including means operative in response to the control signal from the control means to cause the image dissector to scan the image in a circular scan pattern, the image dissector producing the second electrical signals representative of the data encoded in the label in response to scanning the image of the radial data-representing code elements.

PO-1050
(5/69)

UNITED STATES PATENT OFFICE
CERTIFICATE OF CORRECTION

Patent No. 3,553,438                    Dated  January 5, 1971

Inventor(s)    Melvin H. Blitz and George G. Pick

It is certified that error appears in the above-identified patent and that said Letters Patent are hereby corrected as shown below:

In claim 1, column 4, line 70, before "spaced", insert --portion--

In claim 4, column 5, line 70, after "target", insert --being scanned, the scan control circuitry further including means operative in response to the control signal from the control means to cause the image dissector to scan the image of the label in a cycloidal scan pattern, the image dissector producing the second electrical signals representative of the data encoded in the label in response to scanning the image of the radial data-representing code elements--

Signed and sealed this 20th day of April 1971.

(SEAL)
Attest:

EDWARD M. FLETCHER, JR.             WILLIAM E. SCHUYLER, JR.
Attesting Officer                    Commissioner of Patents